(12) United States Patent
Mosley

(10) Patent No.: US 10,393,272 B2
(45) Date of Patent: Aug. 27, 2019

(54) SLEEVE CONFIGURED FOR USE IN A NON-CONTACTING GAS SEAL AND GAS SEAL INCLUDING THE SLEEVE

(71) Applicant: William Kelvin Mosley, Bel Air, MD (US)

(72) Inventor: William Kelvin Mosley, Bel Air, MD (US)

(73) Assignee: Kaydon Ring & Seal, Inc., Baltimore, MD (US)

( * ) Notice: Subject to any disclaimer, the term of this patent is extended or adjusted under 35 U.S.C. 154(b) by 786 days.

(21) Appl. No.: 14/950,358

(22) Filed: Nov. 24, 2015

(65) Prior Publication Data

US 2017/0146132 A1  May 25, 2017

(51) Int. Cl.
*F16J 15/40* (2006.01)
*F16J 15/44* (2006.01)

(52) U.S. Cl.
CPC ............. *F16J 15/40* (2013.01); *F16J 15/44* (2013.01); *F16J 15/442* (2013.01); *F16J 15/443* (2013.01)

(58) Field of Classification Search
CPC ........ F16J 15/342; F16J 15/441; F16J 15/442; F16J 15/443; F01D 11/003; F01D 11/02
See application file for complete search history.

(56) References Cited

U.S. PATENT DOCUMENTS

| 980,282 | A | 1/1911 | Junggren |
| 1,041,534 | A | 10/1912 | Wagner |
| 3,480,284 | A * | 11/1969 | Voitik .................... F16J 15/441 |
| | | | 277/359 |
| 3,575,424 | A | 4/1971 | Taschenberg |
| 3,640,541 | A | 2/1972 | Taschenberg |
| 3,782,737 | A * | 1/1974 | Ludwig .................. F16J 15/342 |
| | | | 277/400 |
| 4,082,296 | A | 4/1978 | Stein |
| 4,145,058 | A | 3/1979 | Hady et al. |
| 4,410,187 | A * | 10/1983 | Legoy ...................... F04D 1/12 |
| | | | 277/347 |
| 4,546,985 | A | 10/1985 | Forch |
| 4,733,873 | A | 3/1988 | Takenaka et al. |
| 5,066,026 | A | 11/1991 | Heck et al. |
| 5,145,189 | A | 9/1992 | Pope |
| 5,169,159 | A | 12/1992 | Pope et al. |
| 5,301,957 | A | 4/1994 | Hwang et al. |
| 5,509,664 | A | 4/1996 | Borkiewicz |
| 5,558,341 | A | 9/1996 | McNickle et al. |
| 6,145,842 | A | 11/2000 | Zellers et al. |
| 6,145,843 | A | 11/2000 | Hwang |
| 7,144,016 | B2 | 12/2006 | Gozdawa |
| 7,377,518 | B2 | 5/2008 | Lai |

(Continued)

*Primary Examiner* — Nicholas L Foster
(74) *Attorney, Agent, or Firm* — Mark Ussai; SKF USA Inc. Patent Dept.

(57) ABSTRACT

A sleeve mountable on a rotatable shaft and configured to form a non-contacting seal with a seal ring surrounding and radially spaced from the sleeve, the sleeve including a radially inner surface configured to be mounted on the rotatable shaft, a radially outer surface, an axially inner surface between the radially inner surface and the radially outer surface, an axially outer surface between the radially inner surface and the radially outer surface and a bore configured to provide fluid communication between gas at the axially inner surface of the sleeve and the radially outer surface of the sleeve.

17 Claims, 5 Drawing Sheets

(56) References Cited

U.S. PATENT DOCUMENTS

| | | |
|---|---|---|
| 7,432,620 B2 | 10/2008 | Freal et al. |
| 7,540,501 B2 | 6/2009 | Flaherty |
| 7,762,558 B2 | 7/2010 | Schoellhorn |
| 7,770,895 B2 | 8/2010 | Zheng et al. |
| 7,914,007 B2 | 3/2011 | Berard et al. |
| 7,931,277 B2 | 4/2011 | Garrison |
| 7,963,525 B1 | 6/2011 | Garrison |
| 8,091,898 B2 | 1/2012 | Garrison |
| 8,272,643 B2 | 9/2012 | Garrison et al. |
| 8,408,556 B2 | 4/2013 | Vasagar et al. |
| 8,905,407 B2 | 12/2014 | Ruggeri et al. |
| 9,631,508 B2 * | 4/2017 | Blais ........................ F01D 11/00 |
| 9,714,712 B2 * | 7/2017 | Kiernan ................ F16J 15/3412 |
| 2003/0026718 A1 * | 2/2003 | Dziver ................... F04D 29/047 |
| | | 417/423.9 |
| 2008/0157479 A1 | 7/2008 | Vasagar et al. |
| 2008/0272552 A1 | 11/2008 | Zheng et al. |
| 2009/0189355 A1 * | 7/2009 | Ueda ....................... F16J 15/342 |
| | | 277/350 |
| 2010/0164183 A1 | 7/2010 | Berard et al. |
| 2014/0197675 A1 | 7/2014 | Morman et al. |
| 2014/0325791 A1 | 11/2014 | Colverson et al. |
| 2015/0167846 A1 | 6/2015 | Haynes et al. |

* cited by examiner

US 10,393,272 B2

SLEEVE CONFIGURED FOR USE IN A NON-CONTACTING GAS SEAL AND GAS SEAL INCLUDING THE SLEEVE

TECHNOLOGICAL FIELD

The present disclosure is directed to a sleeve configured for use in a non-contacting gas seal and toward a gas seal including the sleeve, and, more specifically, toward a sleeve configured for use in a non-contacting gas seal that includes a bore configured to carry gas from a high pressure side of the sleeve to a radially outer side of the sleeve and to a gas seal including the sleeve.

BACKGROUND

Various devices are known for forming a seal between a sleeve fixedly mounted on a rotatable shaft and a housing or other structure surrounding the shaft. One type of seal, sometimes referred to as a non-contact circumferential shaft seal, or non-contact gas seal, is effective in controlling leakage. Such seals include one or more seal rings with circumferential inner faces that are spaced a small distance away from the sleeve. Such seals may be formed from compacted and sintered carbon graphite to provide heat and wear resistance, and they are often formed as a plurality of inter-connectable ring segments to facilitate installation around the sleeve. The seal rings are held in place by a suitable retaining device and may include a biasing device, such as a circumferential or garter spring, for holding the seal segments together.

It is desirable to make the gap between the sleeve and seal ring as small as practicable while substantially preventing the sleeve from contacting the seal ring. To this end, it is known to provide cutouts or pads on the radially inner face of the seal ring in order to generate lift relative to the sleeve and maintain a cushion of gas that helps keep the seal ring away from the sleeve. Various arrangements are also known for routing gas around the outer walls of the seal ring to keep the seal ring in a particular axial location and to maintain a radial spacing from the sleeve.

SUMMARY

The present disclosure provides an improved gas seal and arrangement for maintaining a radial spacing between a seal ring and a sleeve mounted on a rotatable shaft inside the sleeve. To this end, a first aspect of the disclosure comprises a sleeve mountable on a rotatable shaft that is configured to form a non-contacting seal with a seal ring surrounding and radially spaced from the sleeve. The sleeve includes a radially inner surface configured to be mounted on the rotatable shaft, a radially outer surface, an axially inner surface between the radially inner surface and the radially outer surface, and an axially outer surface between the radially inner surface and the radially outer surface. The sleeve also includes a bore configured to provide fluid communication between gas at the axially inner surface of the sleeve and the radially outer surface of the sleeve.

Another aspect of the disclosure comprises a non-contacting gas seal that includes the sleeve described above, and a seal ring having a radially inner side extending around the radially outer surface of the sleeve, a radially outer side, an axially inner side and an axially outer side.

A further aspect of the disclosure comprises a sleeve mountable on a rotatable shaft and configured to form a non-contacting seal with a seal ring radially spaced from the sleeve. The sleeve includes a radially inner surface configured to be mounted on the rotatable shaft, a radially outer surface, an axially inner surface between the radially inner surface and the radially outer surface, and an axially outer surface between the radially inner surface and the radially outer surface. The sleeve also includes pressure generating means for increasing a pressure between the sleeve and the seal ring radially spaced from the sleeve.

BRIEF DESCRIPTION OF THE DRAWINGS

These and other aspects and features of the present disclosure will be better understood after a reading of the following detailed description together with the attached drawings.

DETAILED DESCRIPTION

Figure 1:
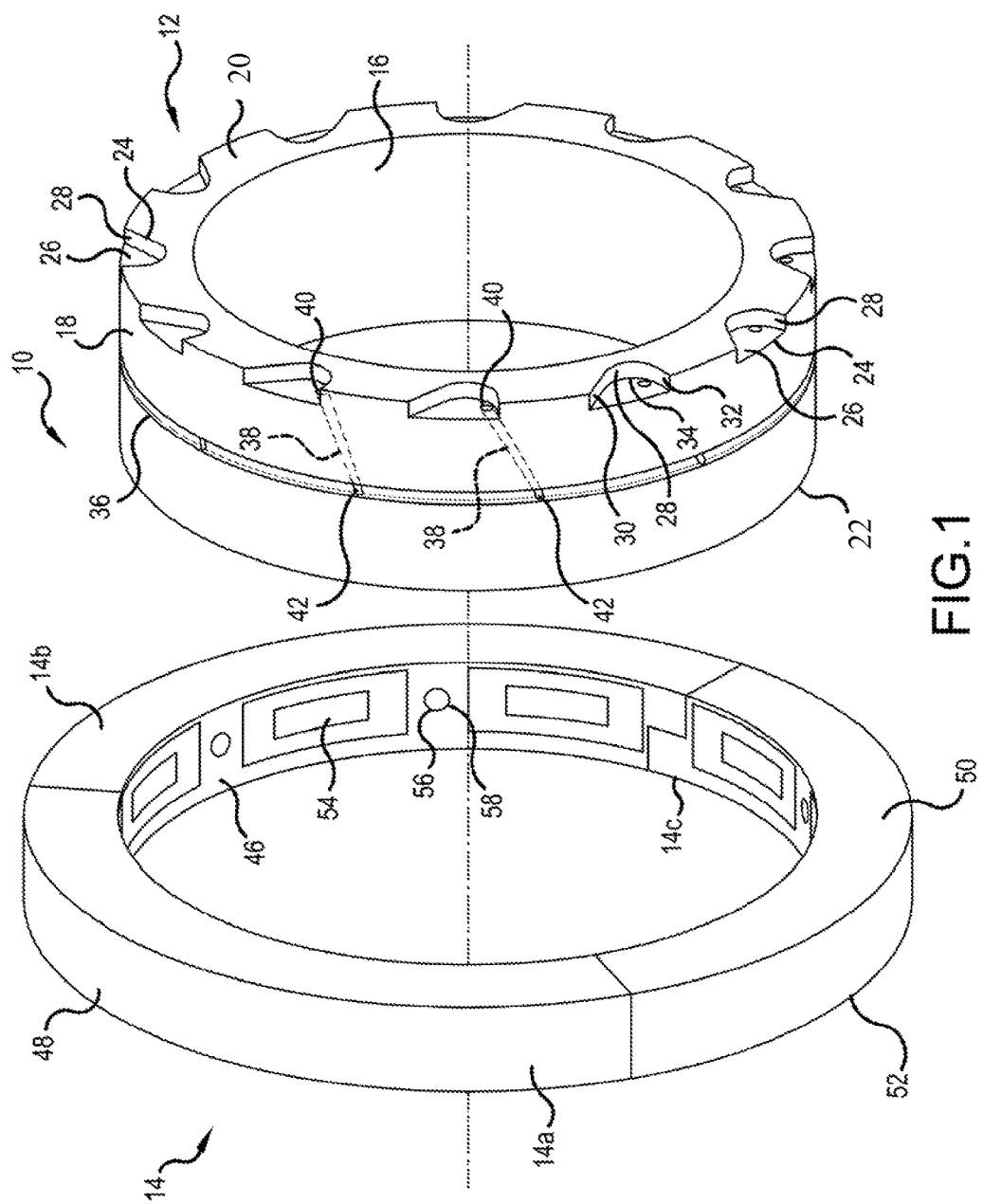
FIG. 1 is an exploded perspective view of a seal that includes a sleeve mountable on a rotatable shaft and a seal ring that surrounds the sleeve.

Referring now to the drawings, wherein the showings are for the purpose of illustrating presently preferred embodiments of the disclosure only and not for limiting same, FIG. 1 shows a non-contact gas seal 10 comprising a sleeve 12 and a seal ring 14. The sleeve 12 is configured to be mounted on a rotatable shaft (not illustrated), and the sleeve 12 includes a radially inner surface 16, a radially outer surface 18, an axially inner surface 20 and an axially outer surface 22. The terms "inner" and "outer" are used herein with reference to the high pressure space that is to be sealed by the gas seal 10; the "inner" side of the gas seal 10 is the high pressure side of the gas seal, the inside of a compressor, for example, and the outer side of the gas seal 10 is a housing of the compressor or the environment around the device in which the gas seal 10 is installed. These terms are used for ease of reference, and the "inner" side of the seal is the side intended to face a higher pressure environment even if in some cases that high pressure environment might not be described as being "inside" something else.

The axially inner surface 20 includes a plurality of recesses 24 that extend into the axially inner surface 20 from the radially outer surface 18. Each of these recesses includes a bottom 26 which faces in a generally axial direction and may or may not be parallel to the axially inner surface 20, and a side wall 28 that extends from the bottom 26 to the axially inner surface 20. The side wall 28 has a first portion 30 that is linear and a second portion 32 that is curved, and the side wall 28 meets the bottom 26 at a junction 34. The shape of the side wall 28 is configured to increase a pressure in the recess 24 when the sleeve 12 rotates. Therefore, other recess shapes could be used without exceeding the scope of the present disclosure.

Figure 4:
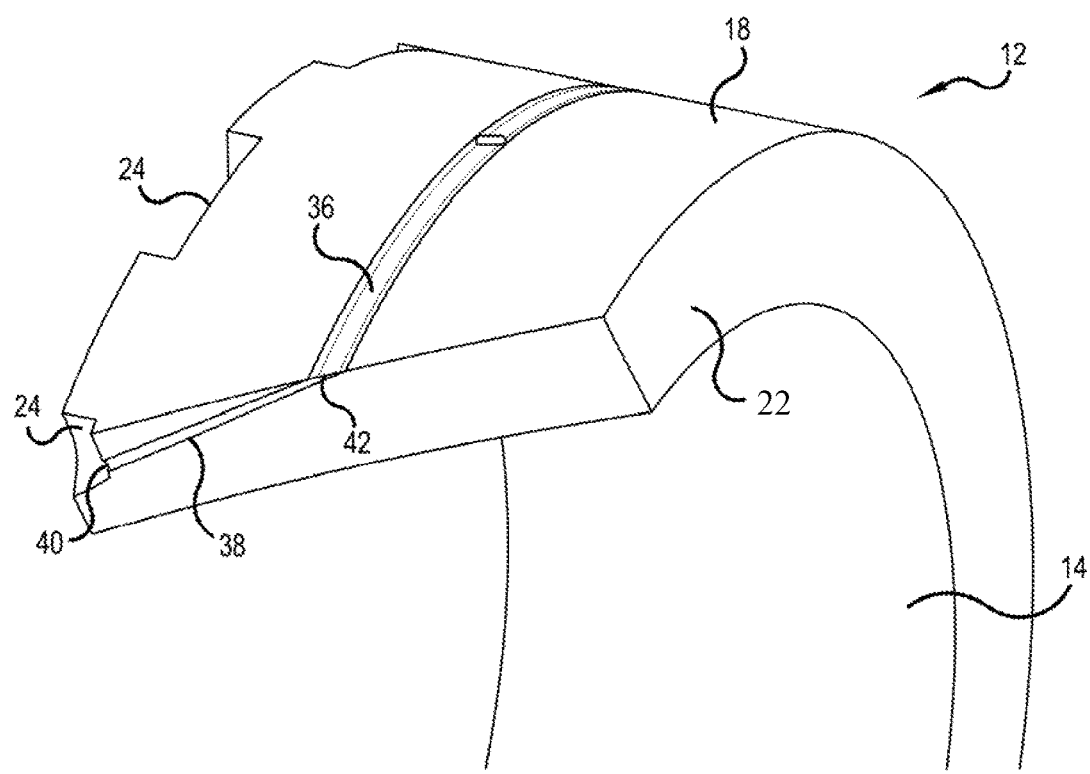
FIG. 4 is a partial sectional view of the sleeve of FIG. 3 taken along line IV-IV in FIG. 3.
Figure 5:
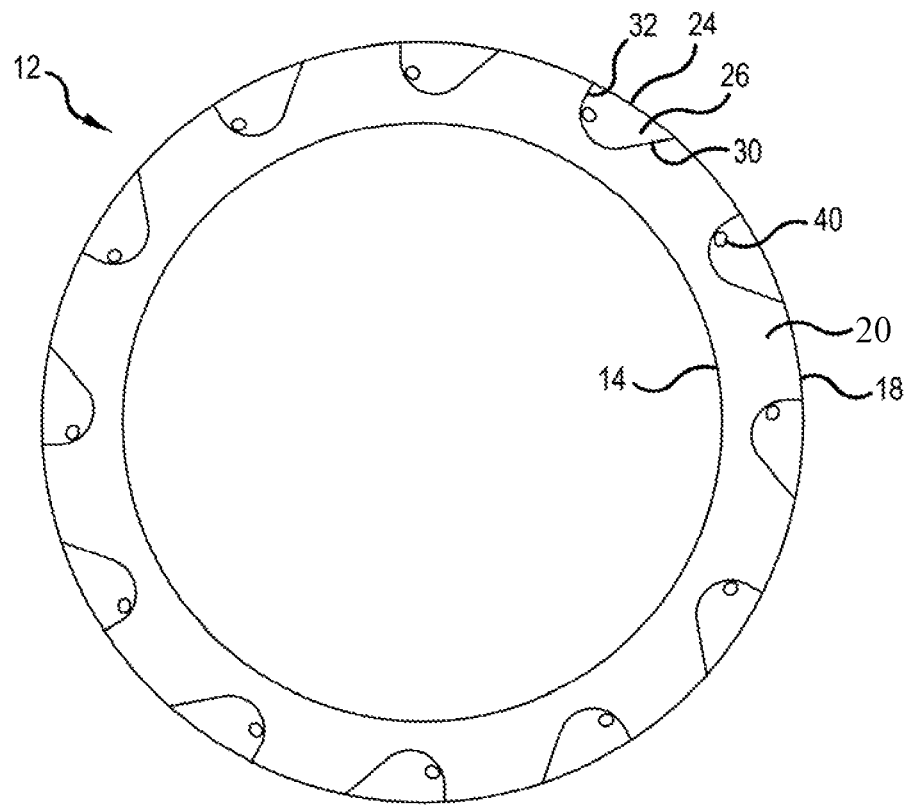
FIG. 5 is side elevational view of the sleeve of FIG. 1.
Figure 6:
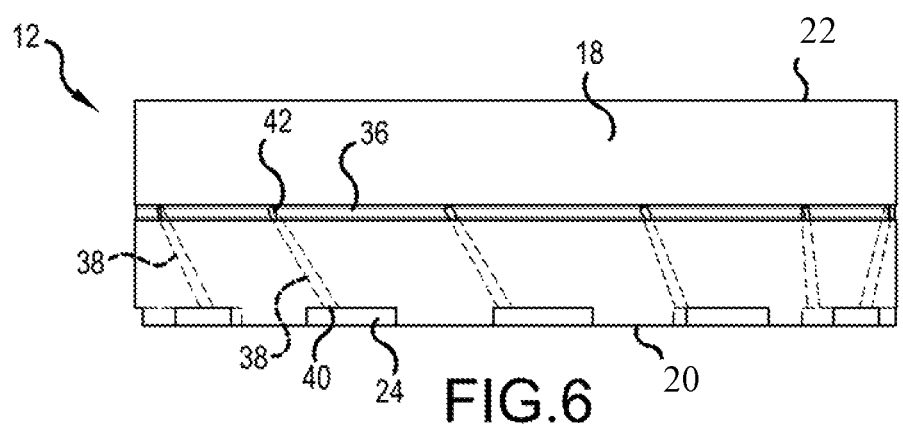
FIG. 6 is a top plan view of the sleeve of FIG. 1.

The radially outer surface 18 of the sleeve 12 includes a circumferential groove 36 that extends completely around the sleeve 12. The groove may be discontinuous in other embodiments. A bore 38 extends from the bottom 26 of each of the recesses 24 to a location on the radially outer surface 18 of the sleeve 12. In the present embodiment, the second end of the bore 38 is located in the groove 36. Moreover, as will be appreciated from FIGS. 4 and 6, the bore 38 preferably tapers in the direction from the axially inner surface 20 to the radially outer surface 18. While a tapered bore 38 is presently preferred, it may be possible to use a constant-diameter bore in other embodiments. The bore 38 has a first end 40 near the junction 34 of the recess bottom 26 and the second, curved portion 32 of the recess side wall 28 and a second end 42 in the groove 36. The second end 42 of the bore 38 is offset from the first end 40 of the bore in axial, radial and circumferential directions, and the bore 38 thus extends at an angle to the axis of rotation of the sleeve (i.e., it is not parallel or perpendicular to the axis of rotation). In some embodiments, the groove 36 and/or the recesses 24 may be omitted such that the bore 38 will extend from the axially inner surface 20 to the radially outer surface 18. Also, as used herein, the bottoms 26 of the recesses 24 may also be considered to be part of the axially inner surface 20.

Figure 2:
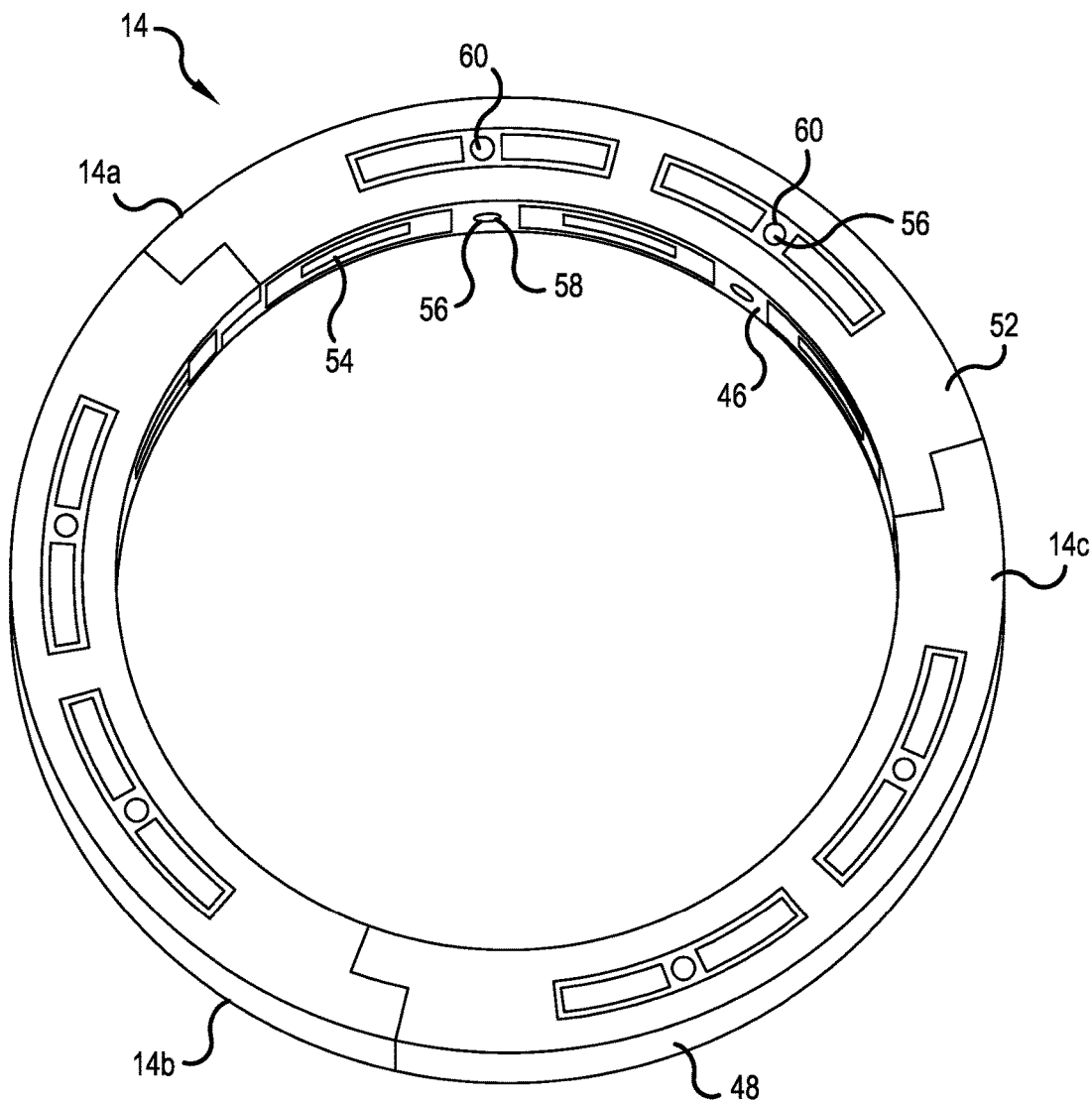
FIG. 2 is a perspective view of the seal ring of FIG. 1.
Figure 3:
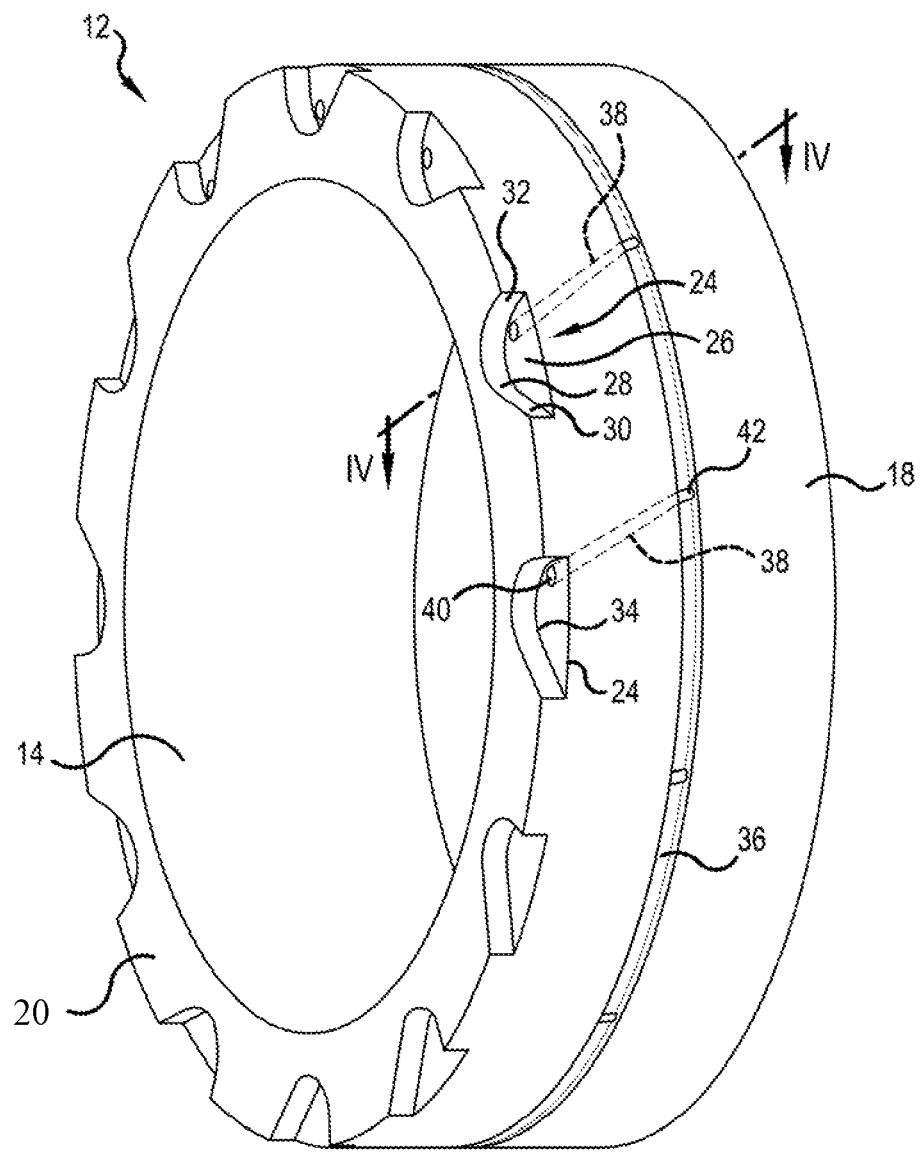
FIG. 3 is a perspective view of the sleeve of FIG. 1.

Turning now to the seal ring 14 illustrated in FIGS. 1 and 2, the seal ring 14 includes a radially inner side 46, a radially outer side 48, an axially inner side 50 and an axially outer side 52. The seal ring 14 itself is formed from three (or more) separate seal ring segments 14a, 14b and 14c which segments allow for the radially installation of the seal ring 14 in a housing (not illustrated) or around the sleeve 12. The radially inner side 46 and the axially outer side 52 also include cutouts 54 that contribute to hydrostatic and/or hydrodynamic balancing of the seal ring 14 relative to the sleeve 12. A bore 56 extends from the radially inner side 46 of the seal ring 14 to the axially outer side 52 of the seal ring 14. A first end 58 of the bore 56 is located between a pair of adjacent cutouts 54 in the radially inner side 46 of the seal ring 14 and a second end 60 of the bore 56 is located in or between a pair of the cutouts 54 in the axially outer side 52. The bore 56 is generally axially centered on radially inner side 46 and radially centered on the axially outer side 52 and may be straight or curved but, for ease of manufacture, may also comprise a first radial portion leading away from the first end 58 and a second axial portion leading away from the axially outer side 52 which first and second portions meet at a right angle inside the seal ring.

The operation of the gas seal 10 is now described. The sleeve 12 is installed on a rotatable shaft (not illustrated) and the seal ring 14 is installed in a housing (not illustrated) around the sleeve 12 so that a very small space (on the order of 2 to 8 micrometers) exists between the sleeve 12 and the seal ring 14. Pressure is increased on the side of the gas seal 10 where the axially inner surface 20 of the sleeve 12 and the axially inner side 50 of the seal ring 14 are located, and even if the sleeve 12 is not rotating relative to the seal ring 14, gas escapes through the gap between the sleeve 12 and the seal ring 14 and also through the bore 38. When the shaft and sleeve 12 begin to rotate, the rotation of the sleeve 12 in combination with the angle made by the bore 38 relative to the axis of rotation, forces high pressure gas into the bore 38. The taper of the bore 38 increases the pressure of the gas in the bore 38, and a relatively high pressure jet of gas exits the second end 42 of the bore 38 between the radially outer surface 18 of the sleeve and the radially inner side 46 of the seal ring 14. When the groove 36 is present, the groove 36 may help to distribute the gas around the circumference of the sleeve 12 and/or equalize the radially outward pressure produced by the plurality of bore second ends 42 in the groove 36. This outward flow of high pressure gas helps form a buffer between the sleeve 12 and the seal ring 14 and helps to maintain the position of the seal ring 14 relative to the sleeve 12.

The second ends 42 of the bores 38 in the axially outer surface 22 of the sleeve 12 are axially aligned with the first ends 58 of the bores 56 in the axially inner side 50 of the seal ring 14, and thus some of the gas exiting the second ends 42 of the bores 38 will enter the first ends 58 of the bores 56 and exit the second ends 60 of the bores 56 in the axially outer side 52 of the seal ring 14. The bores 56 in the seal ring 14 generally have a larger diameter than the diameter of the bore 38 in the sleeve 12.

The diameter of the bore 38 in the sleeve and the amount of its taper and the angle that the bore 38 makes relative to the axis of rotation of the sleeve 12 can be adjusted based on the application in which the gas seal 10 is being used, i.e., based on the pressure difference expected between the high and low pressure sides of the gas seal 10 and on the speed at which the sleeve 12 is expected to rotate relative to the seal ring or gas being compressed. Likewise, the gap between the sleeve 12 and the seal ring 14 and the depth and width of the groove 38 and the diameter of the bore 56 in the seal ring 14 can be selected based on the particular application.

The present invention has been described herein in terms of a presently preferred embodiment. However, modifications and additions to this embodiment will become apparent to persons of ordinary skill in the art upon a reading of the foregoing disclosure. It is intended that all such modification sand additions form a part of the present invention to the extent they fall within the scope of the several claims appended hereto.

What is claimed is:

1. A sleeve mountable on a rotatable shaft and configured to form a non-contacting seal with a seal ring surrounding and radially spaced from the sleeve, the sleeve comprising:
   a radially inner surface configured to be mounted on the rotatable shaft;
   a radially outer surface;
   an axially inner surface between the radially inner surface and the radially outer surface;
   an axially outer surface between the radially inner surface and the radially outer surface; and
   a bore configured to provide fluid communication between gas at the axially inner surface of the sleeve and the radially outer surface of the sleeve,
   wherein the bore extends from the axially inner surface to the radially outer surface,
   wherein the bore has a first end and a second end, the second end being axially, radially and circumferentially offset from the first end,
   wherein the axially inner surface includes a plurality of recesses,
   wherein the first end of the bore is located in one of the plurality of recesses,
   wherein each of the plurality of recesses comprises a bottom and an axial side wall, and
   wherein the end of the bore is located in the bottom at a junction of the axial side wall and the bottom.

2. The sleeve of claim 1, wherein the bore tapers in a direction from the axially inner surface to the radially outer surface.

3. The sleeve of claim 1, wherein the bore is linear.

4. The sleeve of claim 1, wherein the radially outer surface includes a circumferential groove and wherein the second end of the bore is located in the groove.

5. The sleeve of claim 4, wherein the circumferential groove extends completely around the radially outer surface.

6. The sleeve of claim 1,
   wherein the bore is linear and tapers in a direction from the axially inner surface to the radially outer surface, wherein the radially outer surface includes a circumferential groove and wherein the second end of the bore is located in the groove.

7. The sleeve of claim 1, wherein the first end of the bore has a closed periphery defined by the axially inner surface.

8. A non-contacting gas seal comprising:
a sleeve mountable on a rotatable shaft and a seal ring surrounding and radially spaced from the sleeve, the sleeve being configured to form a non-contacting seal with the seal ring,
the sleeve comprising:
a radially inner surface configured to be mounted on the rotatable shaft;
a radially outer surface;
an axially inner surface between the radially inner surface and the radially outer surface;
an axially outer surface between the radially inner surface and the radially outer surface; and
a bore configured to provide fluid communication between gas at the axially inner surface of the sleeve and the radially outer surface of the sleeve,
wherein the bore extends from the axially inner surface to the radially outer surface, and
wherein the bore has a first end and a second end, the second end being axially, radially and circumferentially offset from the first end; and
the seal ring having a radially inner side extending around the radially outer surface of the sleeve without contacting the sleeve, a radially outer side, an axially inner side and an axially outer side.

9. The gas seal of claim 8, wherein the seal ring includes a bore extending from the radially inner side to the axially outer side.

10. The gas seal of claim 9, wherein the seal ring bore includes a first end axially aligned with the second end of the sleeve bore.

11. The gas seal of claim 8,
wherein the radially outer surface includes a circumferential groove, and
wherein the second end of the sleeve bore is located in the groove, and
wherein an end of the seal ring bore is axially aligned with the groove.

12. The gas seal of claim 11, wherein the radially inner side includes a plurality of cutouts configured to generate lift when the seal ring rotates relative to the sleeve and wherein an end of the seal ring bore is located between a pair of the plurality of cutouts.

13. A non-contacting gas seal comprising:
a shaft;
a sleeve having a radially inner surface fixedly mounted to the shaft, a radially outer surface, an axially inner surface between the radially inner surface and the radially outer surface, an axially outer surface between the radially inner surface and the radially outer surface, and a bore extending from the axially inner surface of the sleeve to the radially outer surface of the sleeve; and
a seal ring having a radially inner side defining a seal ring interior, a radially outer side, an axially inner side and an axially outer side;
wherein the sleeve is rotatably mounted in the seal ring interior and configured to rotate in the seal ring interior without contacting the seal ring.

14. The gas seal of claim 13, wherein the bore has a first end and a second end, the second end being axially, radially and circumferentially offset from the first end.

15. The gas seal of claim 14, wherein the radially outer surface includes a circumferential groove and wherein the second end of the bore is located in the groove.

16. The gas seal of claim 13, wherein the bore tapers in a direction from the axially inner surface to the radially outer surface.

17. The gas seal of claim 14, wherein the axially inner surface includes a plurality of recesses having flat bottoms and wherein the first end of the bore is located in the flat bottom of one of the plurality of recesses and wherein the flat bottom is larger than the first end of the bore.

\* \* \* \* \*